United States Patent [19]
Bacon et al.

[11] Patent Number: 5,704,104
[45] Date of Patent: Jan. 6, 1998

[54] METHOD AND MACHINE FOR RECYCLING DISCARDED CARPETS

[76] Inventors: Forrest C. Bacon, 2175 Surrey Trail, Conyers, Ga. 30208; Wendell R. Holland, Rte. 2, Box 289B; Lial H. Holland, Rte. 2, both of Doniphan, Mo. 63935

[21] Appl. No.: 579,264

[22] Filed: Dec. 27, 1995

[51] Int. Cl.$^6$ ............................................. D06M 10/00
[52] U.S. Cl. .............................. 28/299; 28/100; 28/143; 241/23; 241/DIG. 37; 62/293; 62/320; 428/903.3; 264/37; 156/94; 156/153
[58] Field of Search ................. 156/94, 153; 264/37; 428/903.3; 28/299, 100, 143; 241/23, DIG. 37; 62/293, 320

[56] References Cited

U.S. PATENT DOCUMENTS

| | | | |
|---|---|---|---|
| 3,658,259 | 4/1972 | Ledergerber | 241/23 |
| 5,230,473 | 7/1993 | Hagguist et al. | 156/94 |
| 5,240,530 | 8/1993 | Fink | 156/94 |
| 5,271,234 | 12/1993 | Carter et al. | 62/64 |
| 5,288,349 | 2/1994 | Fink | 156/72 |
| 5,494,723 | 2/1996 | Erren et al. | 156/72 |

*Primary Examiner*—Andy Falik
*Attorney, Agent, or Firm*—Patrick D. Kelly

[57] ABSTRACT

A method and machine are disclosed for using a cold dry abrasion step for separating segments of discarded carpet into pile material (usually nylon) and backing layers (usually polypropylene) for recycling. A preferred method of abrasion uses dry ice pellets (made of frozen carbon dioxide) which are ejected at high speed from a set of nozzles that shoot the pellets directly into an abrasion zone, as a segment of discarded carpet on a conveyor system is being stripped apart and disassembled. The dry ice pellets "freeze" the binder material (usually latex) by lowering it to a temperature that makes the binder brittle and easy to break apart. The pellets also serve as abrasive agents, in a manner comparable to sand-blasting; however, unlike sandblasting or liquid (steam or chemical) systems, the dry ice pellets evaporate (sublimate) directly into gas without going through a liquid phase, and without leaving any liquid or gritty residue. This eliminates the need for a drying operation, which saves time and energy and avoids a potential air pollution problem; it also renders the recyclable output material free of unwanted liquid residues, grit, or other materials that would decrease the value of the output material. This invention also discloses other processing methods which use cold dry abrasion, such as the use of freezing to render the latex binder brittle, coupled with the use of pellets made of a compatible material (such as nylon pellets, for carpets with nylone piles) as abrasive agents that can be mixed with the pile fibers that are recovered from a carpet without decreasing the value of the reclaimed pile material.

18 Claims, 4 Drawing Sheets

METHOD AND MACHINE FOR RECYCLING DISCARDED CARPETS

BACKGROUND OF THE INVENTION

This invention relates to a machine and a treatment process for removing the piles from discarded carpets, for recycling purposes and to reduce solid wastes.

Today, most carpets that must be discarded (either because they have become badly worn after use, or because they do not meet appropriate quality standards after manufacture) are buried in landfills, or burned in incinerators. These are not ideal methods of disposal, and it is preferable to recycle them in some manner which reuses at least some of their materials.

Most carpets made today contain pile fibers made of nylon, which are glued to a primary backing layer and a secondary backing layer. Latex is used most commonly as the binder/filler material that glues the piles to the backing layers. Polypropylene is used most commonly to make both of the backing layers. Polypropylene and latex are relatively cheap and strong, which is why they are used so widely in carpet manufacture; by contrast, nylon is substantially more expensive, and it has a substantially higher value when recycled. Latex also has the advantage of being flexible and yielding at room temperatures, so it will not split, fracture, or act in a brittle manner when carpet is rolled up for storage or handling.

Several types of carpet recycling processes have been developed which grind or pulverize carpets into small fragments, which are then treated in any of several ways. Some carpet recycling systems use centrifugal separators, to try to separate most of the polypropylene and latex particles (which are heavier) from the lighter nylon material generated by a pulverizing operation. Other systems leave the nylon mixed together with the polypropylene and latex; the composite mixture is used as a relatively low-grade form of plastic.

In 1993, U.S. Pat. No. 5,230,473 was issued to James Hagguist and Robert Hume, describing an apparatus and process for reclaiming used carpets by loosening the latex binder and tearing apart the carpet segments, to separate the nylon pile from the secondary and primary backing layers. This generates a relatively pure form of recovered nylon, which is more valuable than nylon mixed with less valuable polypropylene and latex.

This multi-step procedure can be referred to by any of several terms, including carpet reclaiming, recycling, stripping, decompiling, or depiling. These terms can be used interchangeably if desired. Since the terms "recycling" and "reclaiming" might be confused with the subsequent processes involved in actually reusing the recovered materials, the preferred term, used herein to refer to the overall process of ripping a carpet apart to separate the nylon pile from the polypropylene backing layers, is "decompiling". The terms "depiling" or "pile removal" are also used herein, to refer to the specific processing step in which loosened strands of nylon pile material are pulled out of the primary backing layer.

The machine and process patented by Hagguist and Hume uses a series of processing steps as listed below, which are lettered to correspond to the callout letters in FIGS. 1 and 14 of U.S. Pat. No. 5,230,473. These same callout letters are used in FIG. 1 of this subject patent application, to refer to the analogous steps which can be used in this invention.

A. A segment of used carpet is loaded onto a large assembly-line type of apparatus, having a series of processing stations, by laying the carpet segment flat (preferably with the pile side down, in the improved embodiment described below) on a large conveyer device. The carpet segment will ride on conveyor bed, usually comprising rollers, a conveyor belt, etc., depending on which step in the process it is passing through.

B. The carpet segment is electronically inspected for metal.

C. The carpet segment is visually inspected.

D. In U.S. Pat. No. 5,230,473, section D comprises a set of rejection doors that can be opened in case a carpet segment fails either metal or visual inspection. These doors can be used to divert the segment and remove it from the conveyor line. In the improved embodiment disclosed herein, such doors are unnecessary; the pile side will be facing downward, and each component which is stripped away from the carpet will be lifted up and removed while the remaining carpet rides across the conveyor.

E. If the carpet has a continuous-loop type of pile (as in shag carpets), a loop-cutting device can be lowered onto it, if desired, to cut through the loops so that each strand can be pulled out from the primary backing at a later stage.

F. Additional rejection doors are provided in case the loop cutting step was not adequately thorough.

G. The carpet is sprayed with suitable pressurized fluid (such as pressurized steam, containing detergents or solvents if desired) to loosen the latex which holds the secondary backing to the carpet.

H. The secondary backing layer is pulled away, using a set of rotating impingement devices.

I. Additional rejection doors are provided in case the secondary backing removal step was not successful.

J. Another spraying step using high-pressure steam (with solvents or other fluids if desired), coupled with abrasive brushes, is used to loosen and remove the latex binder which glues the nylon pile to the primary backing layer.

K. Additional rejection doors are provided in case the latex removal step was not successful.

L. Rotating mechanical impingement devices are used to pull strands of nylon pile out of the primary backing layer.

M. Additional rejection doors are provided in case the pile removal step was not successful.

N. The primary backing layer, stripped of the nylon piles, is sent to a collection device.

This process and apparatus appears to be a major improvement over other prior methods of recycling carpet materials. However, it suffers from certain limitations which are overcome by the improvement disclosed herein. These limitations relate to the requirement that high-pressure steam (and, for certain types of carpets, other chemicals such as surfactants; see Column 4, lines 4–17) and other fluids must be used to loosen and remove the latex binder.

These fluids generate several problems. In most cases, their use will require a drying step, which will consume large amounts of energy, slow down the processing rate, and reduce the through-put capacity of the processing apparatus; the drying step may also generate an air pollution problem, if any chemicals such as solvents or surfactants are used. If the latex removing fluid is not thoroughly dried and removed, it will increase the weight and the costs of storing and shipping the output material, and fluid impurities (including any dried residue chemicals from the fluid) will reduce the grade and the value of the recyclable nylon output material. In addition, any unevaporated water will greatly increase the risk of mildew and fungus growth in the output materials.

Accordingly, one object of the subject invention is to disclose an improved processing step which eliminates the need for at least one and preferably both of the fluid-using steps that have been disclosed in the prior art for loosening and removing the latex binder in carpet that is being stripped apart for recycling. This improved processing step can be used as a substitute for the fluid-using steps (i.e., steps G and J) in the process disclosed in U.S. Pat. No. 5,230,473, discussed above. They can also be adapted for use in any other methods or systems that are now known or hereafter developed for depiling or decompiling carpet, to remove the secondary and/or primary backing layers or any latex filler from carpets or carpet pile material.

Another object of this invention is to disclose that dry ice pellets, ejected from a nozzle under suitable pressure, can be used in a completely dry, fluid-free processing step which is effective in loosening and removing the latex binder in carpet that is being stripped apart for recycling.

Another object of this invention is to disclose that any of several types of dry systems can be used to loosen and remove the latex binder in carpet that is being stripped apart for recycling.

Another object of this invention is to disclose that any of several types of freezing techniques, such as the use of dry ice pellets, can be used to render the latex binder in carpets brittle and breakable, so that it can be more easily removed when carpet is being stripped apart for recycling.

These and other objects of the invention will become clear through the following summary, drawings, and detailed description.

SUMMARY OF THE INVENTION

A method and machine are disclosed for using a cold dry abrasion step for separating segments of discarded carpet into their various components (usually nylon pile material, and polypropylene backing layers) for recycling purposes. A preferred method of abrasion uses dry ice pellets (made of frozen carbon dioxide) of suitable size and shape. The dry ice pellets are ejected at high speed and under a suitable pressure (such as about 60 to 90 pounds per square inch) from a set of nozzles that shoot the pellets directly into an abrasion zone as a segment of discarded carpet on a conveyor system is being stripped apart and disassembled. The dry ice pellets "freeze" the binder material (usually latex) by lowering it to a temperature which makes it brittle and easier to break apart. The pellets also serve as abrasive agents, in a manner comparable to sand-blasting; however, unlike sand-blasting or liquid (steam or chemical) systems, dry ice pellets evaporate (sublimate) directly into gas without going through a liquid phase, and without leaving any liquid or gritty residue. This eliminates the need for a drying operation, which saves time and energy and avoids a potential air pollution problem; it also renders the recyclable output material free of unwanted liquid residues, grit, or other materials that would decrease the value of the output material.

This invention also discloses other processing methods which use cold dry abrasion, such as the use of freezing to render the latex binder brittle, coupled with the use of pellets made of a compatible material (such as nylon, for carpets with nylon piles) as abrasive agents that can be mixed with the pile fibers that are recovered from a carpet without decreasing the value of the reclaimed pile material.

DESCRIPTION OF THE PREFERRED EMBODIMENTS

As summarized above, this invention discloses the use of cold dry abrasion, using "dry ice" (frozen carbon dioxide) or other suitable pellets as an abrasive agent for loosening latex (or other binder material), at cold temperatures which render the binder material brittle, in discarded carpet segments. This loosening and removal of binder material is an important step in separating carpet piles (usually made of nylon fibers) from carpet backings (usually made of polypropylene). Processing using cold dry abrasion acts in a manner comparable to a sandblasting operation, but without leaving an undesired gritty or fluid residue.

The abrasion process can be used at any desired number of steps in a carpet decompiling process, such as at step G and/or at step J, in a multi-step carpet decompiling process as depicted in U.S. Pat. No. 5,230,473, described above, which describes an automated multi-step decompiling operation. The cold dry processing described herein can be used to provide an improved method of carrying out certain steps in that operation, or in any other method of decompiling discarded carpet segments which may not be as fully automated as the process described in U.S. Pat. No. 5,230,473.

Figure 1:
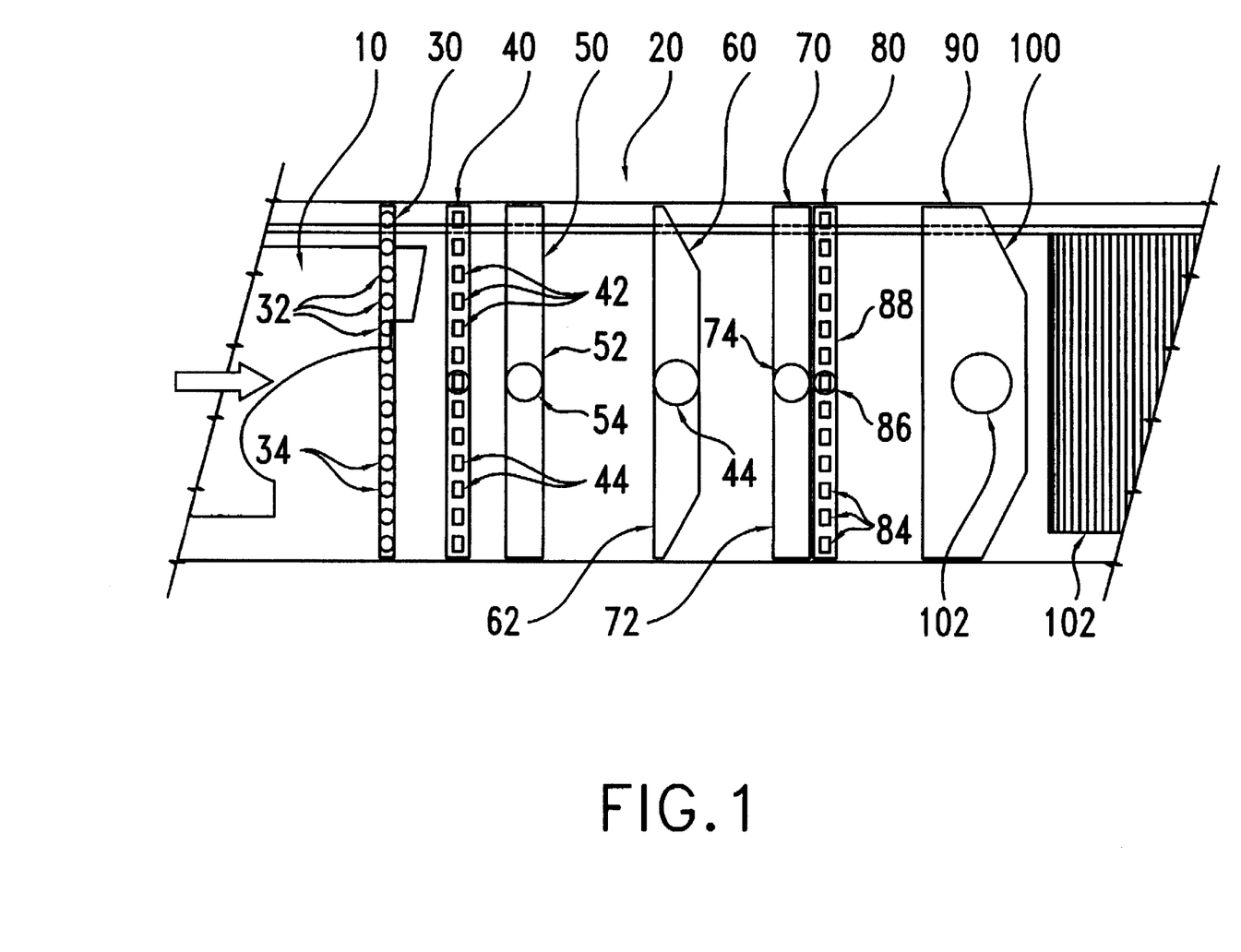
FIG. 1 is a plan view, from above, showing a conveyor assembly of this invention carrying a carpet segment 10 beneath a width detector array and various nozzle arrays and removal devices.
Figure 2:
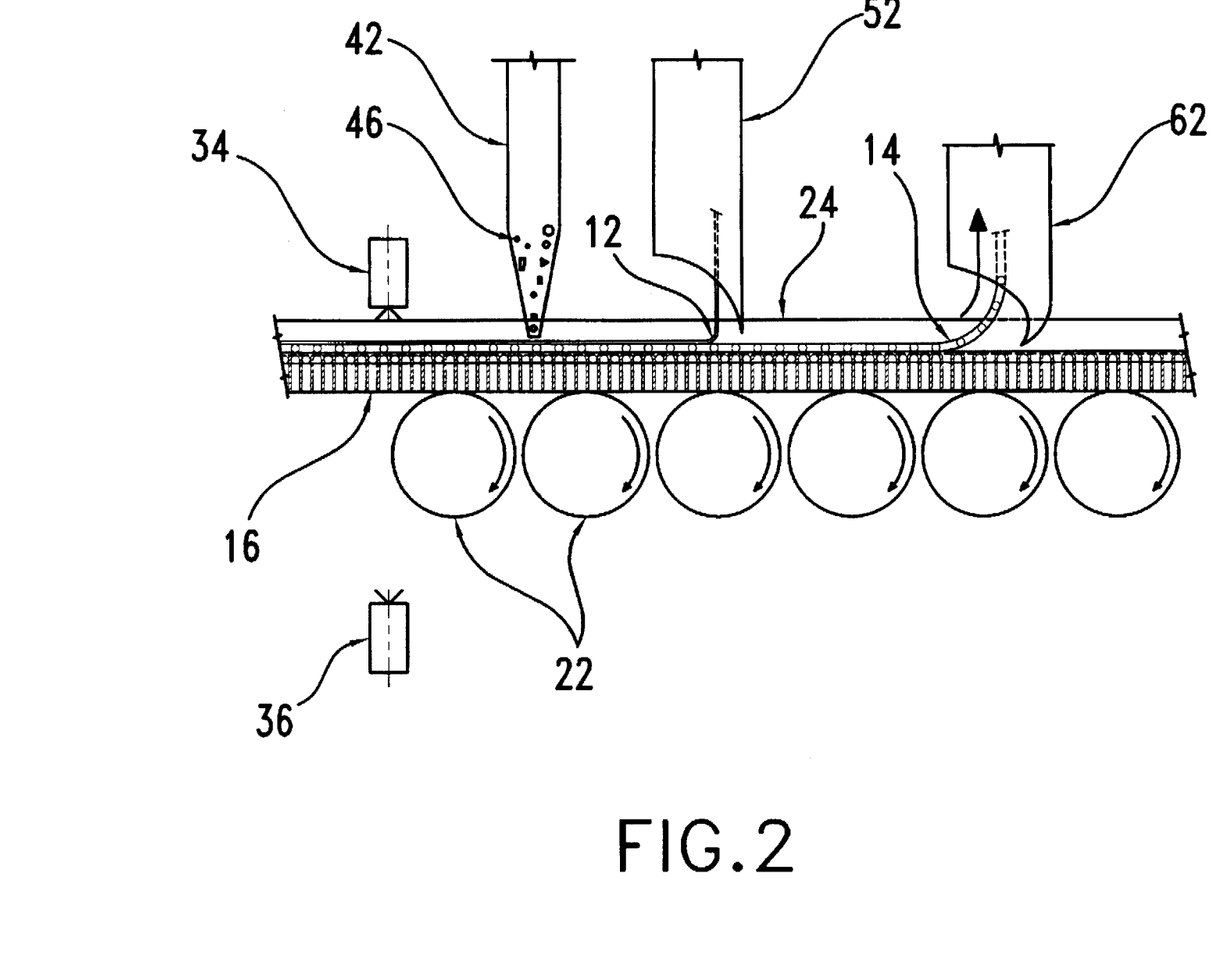
FIG. 2 is a side elevational view showing the conveyor assembly of FIG. 1, in which a thin layer of backing latex and a propylene secondary backing layer are removed.
Figure 3:
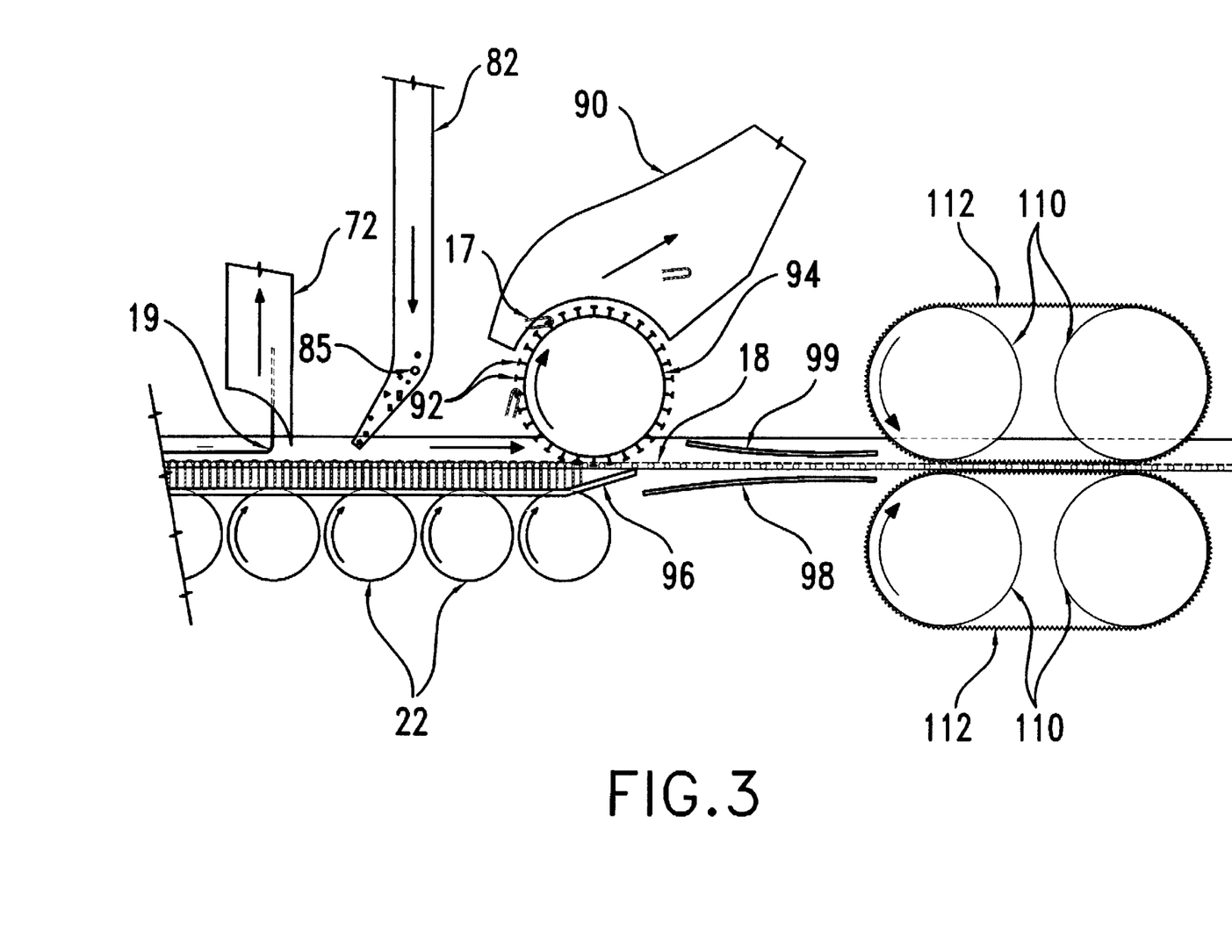
FIG. 3 is a cross-sectional side view showing the pile fibers being stripped out of a primary backing layer.

In one preferred embodiment of this invention, shown from the top in a plan view in FIG. 1 and in side elevation views in FIGS. 2 and 3, a segment of discarded carpet 10 is being carried on a conveyor bed 20. A typical carpet segment 10, shown with the pile side down in FIG. 2, comprises a thin layer of latex binder material 12 which generally sits exposed on top of a secondary backing layer 14, which is typically made of cross-woven polypropylene strands. The secondary layer 14, which is shown being removed by lifting in FIG. 2, sits on top of pile material 16, made of a large number of individual fibers 17; these are usually made of nylon, in carpets that are valuable for recycling. The pile fibers 16 are attached to a primary backing layer 18 by additional binder material 19 (items 17–19 are shown more clearly, in a simplified schematic depiction, in FIG. 3). As a result of their construction methods, most carpets have a relatively thin layer of latex binder (shown as layer 12) on their outermost bottom surface, on the outside of the secondary backing layer 12, and a substantially thicker layer of binder material 19 which is interspersed among the primary backing layer 18 and the base of the pile fibers 17.

During decompiling, the carpet segment 10 is supported and carried by a conveyor device 20, which can utilize exposed rollers 22 as shown with steel rails 24 on their periphery, or a conveyor belt or other suitable driving device as desired. The conveyor system can also comprise a combination of driving and supporting devices, such as exposed rollers at one position, a conveyor belt or patterned tractor drive belt at a different position, and an anvil table at a third position.

If desired, carpet segments being processed can be flattened and secured against the conveyor device 20 by means of vacuum devices or mechanical gripping or clamping devices. Flattening devices can be used continuously (for carpet segments that attempt to roll up or crease if not restrained), or positioned specifically under lifting devices that pull away the secondary backing layer or pile fibers from the primary backing layer.

The automated devices described herein also can be supplemented, if desired, by various types of manual processing. For example, operators on each side of a carpet segment, holding manually controlled dry ice blasting nozzles on flexible hoses, can carry out a brief step of manually abrading and removing part of the binder material at the leading corners or edges of a carpet segment, so that clamping or gripping devices can be secured to the leading corners or edges of the primary backing layer, to facilitate vacuuming or other modes of lifting away and removing abraded binder material and the secondary backing layer from the primary backing layer.

Unlike the conveyor device shown in U.S. Pat. No. 5,230,473, the system illustrated herein is designed so that a discarded carpet segment should be loaded pile-side down, with the polypropylene backing layers on top. This is believed to be generally preferable, since it allows material to be lifted away and removed without requiring any trap doors or other potentially snagging or entangling devices or obstructions in the conveyor bed. If an inspection and rejection step is desired, it can also involve lifting away a rejected segment, rather than sending it down through a trap door.

If the carpet contains continuous loop piles (such as in shag carpet), the loops can be cut using cutting devices as shown in step E and in FIG. 3 of U.S. Pat. No. 5,230,473. If necessary, any loop cutting operation presumably should be carried out before the dry ice blasting and backing removal steps described below, to avoid unwanted ripping and tearing of a weakened carpet segment, which would be more likely to occur if the loops are cut after the binding has been abraded and the secondary backing layer has been removed.

Carpet segment 10 is shown in FIG. 1 as having an irregular shape, due to installation around various appliances, building columns, or other devices or structures while in use. If desired, the carpet segment 10 can be positioned with one of its side edges aligned against a short vertical retaining wall 24, shown in FIGS. 2 and 3, which flanks one side of the conveyor bed 20. This alignment step can be carried out manually, or by means of diagonally-mounted conveyor supports as shown in step A of U.S. Pat. No. 5,230,473.

The carpet segment 10 passes beneath a sensor array 30 which holds a plurality of spaced sensor devices, which are grouped for purposes of description into sensor group 32 and sensor group 34. These sensor devices use vertical beams of light, or other suitable detection means, such as spring-mounted electrical contacts that ride on top of each carpet segment) to continuously determine the width of each carpet segment being passed through the system. For example, when the carpet segment 10 passes beneath the sensor rack 30, the light beams from sensors 32 will be blocked by the carpet, while the light beams from sensors 34 will not be blocked. The unblocked light beams from sensors 34 will impinge upon and activate spaced sensor detectors 36 located beneath the carpet (shown in FIG. 2). The sensor detectors should not be obscured or blocked by any rollers, belts, or other devices in the conveyor system.

Electronic signals that are generated by each sensor detector 36 are used to control downstream processing of the carpet. For example, dry ice blasting nozzles 44 and 84 in nozzle arrays 40 and 80 will be turned off as the leading edge of carpet segment 10 passes beneath those nozzle arrays, since the leading edge of the carpet as illustrated will not block the light beams from sensors 34. This operation involving turning certain nozzles on or off as carpet segments pass beneath them is carried out by means of an automated control system that keeps track of how fast and how far each carpet segment moves during treatment. Preferred carpet travel speeds for prototype systems currently under development are in the range of about 10 to about 20 feet per minute (linear carpet motion). However, these operating speeds may be increased substantially if the promising results of early tests using dry ice blasting can be scaled up to full-size decompiling units.

To complete the description of the plan view in FIG. 1, and to introduce the devices in FIGS. 2 and 3, item 40 is the first dry ice blasting nozzle array, which contains a plurality of spaced nozzles 42 (which will be activated when the leading edge of carpet segment 10 appears under them) and 44 (which will be activated later, when following portions of carpet segment 10 pass beneath them). The abrasion caused by dry ice pellets 46 emerging at high speed and under suitable pressure from nozzles 42 breaks apart the thin latex layer 12 that usually sits on top of and permeates into a secondary backing layer 14.

Item 50 is a vacuuming or other removal device that lifts away and removes the fragments of latex binder 12. This device comprises a shaped cowl or hood 52 which extends over the entire width of the conveyor 20, coupled to a round duct or other conduit 54 mounted above cowl or hood 52, which carries the fragments to a suitable receptacle, such as a large disposable filter bag.

Item 60 is a lifting device for pulling up and stripping away the secondary backing layer 14, made of woven polypropylene. This device also comprises a wide cowl or hood 62, coupled to a vacuum duct 64; however, the vacuum duct 64 does not receive or carry the backing layer 14 which is too wide to fit into the vacuum duct 64. Instead, vacuum duct 64 is used merely to exert a steady vacuum on the backing layer, to facilitate its lifting and removal. The backing layer 14 is conveyed by cowl or hood 62 to any suitable receptacle, such as a flat surface or pallet for subsequent removal and transportation by an elevator or forklift truck.

Item 70 is a second vacuuming device, positioned immediately adjacent to and in front of a second dry ice blasting nozzle array 80, which comprises a plurality of spaced nozzles 82 (activated when the leading edge of carpet segment 10 appears under them) and 84 (activated when subsequent carpet portions pass beneath them). Based on early tests, it is believed that aiming pellets 86 into an abrasion zone at an angle, as shown by slanted nozzle in FIG. 3, may help improve the efficiency of the abrasion and binder removal operation.

Vacuuming device 70 comprises a wide cowl 72 coupled to a vacuum conduit 74. Nozzle array 80 comprises a supply hose or other conduit 86 coupled to a wide manifold 88 that distributes pellets among any nozzles that are active at a given moment. This combined blasting-and-removal operation abrades, breaks apart, and removes the binder material 19 which glues pile fibers 17 to the primary backing layer 18.

A protective and vacuuming cowl 90 helps vacuum away or otherwise remove pile fibers 17 after the pile fibers 17 have been pulled out of the primary backing layer 18 by means of hooks 92 or other grabbing or impinging devices that protrude from the surface of rotary puller 94, which is rotating in a direction counter to the travel of carpet segment 10. If desired, this pile removal operation can be facilitated by a slanted support surface 96 and by track guides 98 and 99, as shown in FIG. 3. Protective and vacuuming cowl 92, which is wide enough to cover the width of the entire conveyor system 20, is coupled to a converging cowl 100 and a vacuum duct or conduit 102, which removes the recovered nylon to an appropriate receptacle, such as filter bags which can be used to trap and consolidate the nylon fibers and fluff while air passes through the walls of the filter bags and exits the bags.

FIG. 2 also shows four tractor rollers 110 which drive tractor drive belts 112, positioned above and below the primary backing layer 18 and pressed against the layer 18 by spring-mounted, hydraulic, pneumatic, or other suitable systems that maintain the pressure of the tractor drive belts 112 on both sides of backing layer 18. The belts 112 and 114 can be designed with irregular or waffle-type surfaces or with studded or ridged tractor treads, as shown, to maintain a secure non-slipping grip on the primary backing layer 18, as pile fibers 17 are being pulled out and away from layer 18.

However, even though the tractor drive belt preferably should be designed for maximum traction, to minimize the possibility of tearing or shredding the primary backing layer 18 if anything jams, the mechanism used to provide power to the tractor rollers 110 should be provided with some form of clutch, rubberized V-belts with pulleys, or other tolerant mechanism that will allow the drive rollers 110 to disengage or stop turning if a carpet segment becomes jammed in the system.

If desired, one or more additional stripping rollers (comparable to first stripping roller 94) can be provided downstream of the first stripping roller, to ensure removal of as much pile material as possible. This can allow successive stripping rollers to be designed with specially adapted gripping protrusions, which can be varied depending on whether that roller is working against a full pile layer, or an already-thinned set of pile fibers.

For example, a first stripping roller with widely-spaced pile-gripping protrusions can be designed to remove about 25 to 50 percent of the pile fibers; this will substantially weaken any binder material that remains in the carpet. A second stripping roller can be designed to remove most of the remaining pile fibers, to reach or exceed a roughly 90% level of removal, then a third stripping roller with very tightly-spaced protrusions can be used to complete the removal operation with an even higher degree of efficiency than can be obtained with only one or two stripping rollers. The preferred number of stripping rollers is a matter of economic optimization.

Processing Factors

Turning now to the processes rather than just the equipment, the blasting nozzles in nozzle arrays 40 and 80 will blast out thousands (or even tens of thousands) of small dry ice pellets 46 and 86 as each linear foot of the carpet segment 10 passes beneath nozzle arrays 40 and 80. These dry ice pellets (produced as described below) are ejected at high speed and under a suitable pressure (discussed below). When they hit the backing layer of a carpet segment 10, they "freeze" and abrade the binder material. As used herein, "freezing" of latex or other binder material (which is moderately flexible at room temperature, to allow carpet segments to be rolled up for transportation and handling) refers to reducing the temperature of the binder material until it becomes substantially brittle, which renders it more easily broken. In addition to rendering the binder material brittle, the dry ice pellets also abrade, loosen, and fragmentize the binder material.

The dry ice pumping operation is comparable to a sand-blasting operation, and the pellets can be regarded as being "blasted" at the abrasion zone as the carpet segment passes through the system. However, these dry ice pellets have two very useful characteristics that are totally different from a sand-blasting operation: (1) they "freeze" the binder material, thereby rendering it brittle and easier to fracture and break apart; and, (2) they completely evaporate and disappear after impact, and avoid any gritty or fluid residue, leaving the separated carpet material as pure and uncontaminated as possible, thereby increasing its value as a feedstock for recycling, without requiring a drying operation.

Substantially all of the width of the carpet segment passing beneath a nozzle array should be abraded by dry ice blasting. If a sufficient number of nozzles are provided in an array, they can be stationary, particularly if the nozzle tips are splayed (flattened) so that they will distribute pellets across the entire abrasion zone. Alternately, the nozzles in an array can be moved in a controlled manner (such as in a reciprocating side-to-side motion), to reduce the number of nozzles needed for complete coverage of the entire width of a carpet segment. Reciprocation can be provided by conventional mechanical means, and can be facilitated by various design approaches such as using flexible hoses to couple the nozzles to a dry ice pellet generator.

Dry ice blasting units come equipped with pressure regulators, and their output can usually exceed 100 psi, which is useful for various other types of blasting and abrading operations. However, in tests using such equipment on used carpet samples, it was found that 100 psi was too high for most samples of used carpet that were tested, and that a somewhat lower output pressure of about 60 to 90 pounds per square inch (psi; in metric terms, about 4 to about 6.5 kg/cm$^2$, or about 400 to 600 kPa), provided better results. This pressure range can be varied and optimized using routine testing, and can be manually controlled by an operator as each carpet segment is loaded onto a decompiling unit, depending on factors such as the type of binder material used in the carpet, the type and thickness of the carpet pile, and the age and condition of the carpet segment.

In addition to controlling the blasting pressures, various other operating parameters can also be controlled, including pellet diameters and flow rates. Any of these parameters can be optimized for each step of this operation, using routine testing, and these parameters do not need to be the same for all processing steps. For example, relatively large and coarse pellets under moderate pressure might be optimal for initially blasting the secondary backing layer, using nozzle array 40, while smaller pellets under higher pressures might be preferred for nozzle array 80, to optimize breakage and removal of the binder that remains after the secondary backing layer has been stripped off. In general, it is presumed that pellets generated by breaking apart cylindrical material (as occurs in extruded dry ice pellets) are likely to be preferable to uniformly spherical pellets, since cylindrical pellets will tend to have more rough and jagged edges, which tend to be more effective for abrasion. If nylon or other synthetic pellets are used instead of dry ice, as described below, the preferred type and shape of the pellets will depend on economic factors, including the cost of manufacture of each type of pellet and the abrading effectiveness of each shape or type.

Pumping units which are specifically designed for generating and pumping dry ice pellets, and which are provided with variable pressure and flow rate controls, with changeable extrusion devices that generate pellets having different diameters, and with other means for allowing these and other operating parameters to be varied in a controlled manner, are commercially available from various suppliers. Examples include the HP200, HP500, and HP1000 pellet extruders sold by TomCO$_2$ (Loganville, Ga.); the model numbers indicate the number of pounds per hour of dry ice pellets generated by each system. Various "cleaning systems" (which includes a holding tank, pressure regulator, and hopper-type distribution system that conveys the pellets to the hose and nozzle) are available, including the DI250 system, also available from TomCO$_2$. Most such units that are currently available to the public use compressed air as a propellant. However, the Applicants believe that other types of dry ice blasting units are being developed and may soon become available, which use centrifugal impellers or other mechanical systems rather than compressed air; those units may have certain advantages over compressed air units, for use as described herein. As used herein, terms such as "pumping" and "pressure" are deemed to include devices that use centrifugal impellers or other mechanical devices to "pump" pellets, since the purpose and effect of such devices is to pump a semi-fluid mixture, containing small pellets entrained in air or other fluid, in a manner that generates a suitable speed and pressure as the semi-fluid mixture including the pellets emerges from a hose or nozzle.

Preferably, if two different nozzle arrays are used as shown in FIGS. 1–3, the second nozzle array 80 should be positioned relatively close to the first nozzle array 40, since placing the two blasting steps close together can minimize the amount of dry ice required, by taking advantage of the fact that the binder has already been chilled to a temperature that renders it brittle, and by blasting it a second time before it can warm up.

In addition, either or both of these blasting steps (or possibly a single combined blasting operation, as described below) can be carried out in a refrigerated chamber, to take maximal advantage of the tendency of latex and other carpet binders to become brittle when subjected to cold temperatures, and to maximize the recovery of dry ice pellets or carbon dioxide vapors. Alternately or additionally, a freezing device can be provided in the conveyor system, to press the carpet backing against a cold surface or otherwise chill it immediately before it is blasted with dry ice pellets. In either situation, placing the two nozzle arrays 40 and 80 as close together as reasonably practical can minimize the size of the refrigeration chamber or the length of a refrigerated conveyor segment, thereby reducing refrigeration costs.

In an alternate preferred embodiment of this invention, a single dry ice blasting step might be adequate to break apart and loosen the binder material which binds both the secondary backing layer 12 and the primary backing layer 18 to the pile layer 16, or to decompile carpet segments that do not have two different backing layers. This may be possible, because most secondary backing layers have a relatively open weave, with up to about ⅛ inch (3 to 4 mm) of open space between adjacent strands of polypropylene. Accordingly, a large number of dry ice pellets will pass through the open spaces in the secondary backing layers and immediately begin to break apart the primary layer of binder material. In addition, as noted above, the stripping operation which is used to pull out the pile fibers (especially if a stripping operation is used with a series of stripping rollers) will cause further breakage, loosening, and removal of any remaining binder material; this may be especially effective if the binder material remains cold and brittle. Accordingly, preliminary tests on used carpet samples have indicated that in at least some carpet segments, a single blasting operation is sufficient to allow relatively thorough decompiling of the carpet.

During testing operations carried out to evaluate this system, the dry ice pellets tended to disintegrate as soon as they smashed against the carpet, and provided no opportunity for recycling the dry ice, except possibly for collecting carbon dioxide vapors and refreezing the vapors to generate more dry ice. However, depending on the pellet size and other operating parameters of a specific system, a system which uses dry ice blasting can provide for collection and recycling of dry ice pellets if they remain intact after they have impacted the carpet in the abrasion zone.

In addition, initial testing was not carried out in a refrigerated chamber. By contrast, in a full scale operation, either or both blasting operations (or a single combined blasting operation) can be carried out in a refrigerated chamber, to take maximal advantage of the tendency of latex or other binders to become brittle when subjected to very cold temperatures, and to maximize the recovery of dry ice pellets or carbon dioxide vapors. Alternately or additionally, as mentioned above, a freezing device can be provided in the conveyor system, to press the carpet backing against a cold surface or otherwise chill it immediately before it is blasted with dry ice pellets.

Alternate Embodiments that Use Dry and Cold Processing

This invention discloses dry ice blasting as a convenient and commercially available system which combines two factors: (1) cold temperatures, which are useful for rendering latex or other carpet binder materials brittle and easily broken and fragmented; and, (2) the use of dry, non-chemical mechanical force (such as abrasion as described above, or pressure or hammering as described below) to break apart and loosen binder material, without requiring any steam, chemicals, or liquid to contact the segment of discarded carpet, and without leaving any unwanted residue. These two factors (cold temperatures, and dry mechanical force) can be used, either alone or together, to improve the process of decompiling carpet (i.e., tearing it apart into its components, so that each component can be treated and used appropriately, such as for high-value recycling purposes).

As an example of a process which uses cold temperatures in conjunction with dry mechanical forces, other than abrasion, to facilitate the breakage and removal of binder material, a carpet segment can be passed through a freezing chamber. While the latex (or other binder material) remains frozen (i.e., at a cold temperature, substantially below room temperature, which causes it to be substantially brittle), the binder material can be ground, hammered, or otherwise pulverized into fragments, while the primary backing layer remains relatively intact to facilitate subsequent handling and decompiling of the carpet segment (in particular, leaving the primary backing layer intact allows the decompiling process to be completed by an automated conveyor device, as shown in FIG. 1). The grinding, pounding, or other mechanical step used to break and fragment the frozen binder material can be carried out using any suitable mechanical device. Such devices might include, for example, flat-surfaced rollers, which can press a carpet segment under several tons of pressure; rollers having spherical or other non-flat surface configurations, which can bend and flex a carpet segment without tearing it, and hammer-type devices, which can pound and/or grind a carpet segment which is supported by a non-yielding anvil surface. Such mechanical processing can be carried out on intact carpet segments, or after the secondary backing layer has been removed to expose the primary backing layer and its binder.

Figure 4:
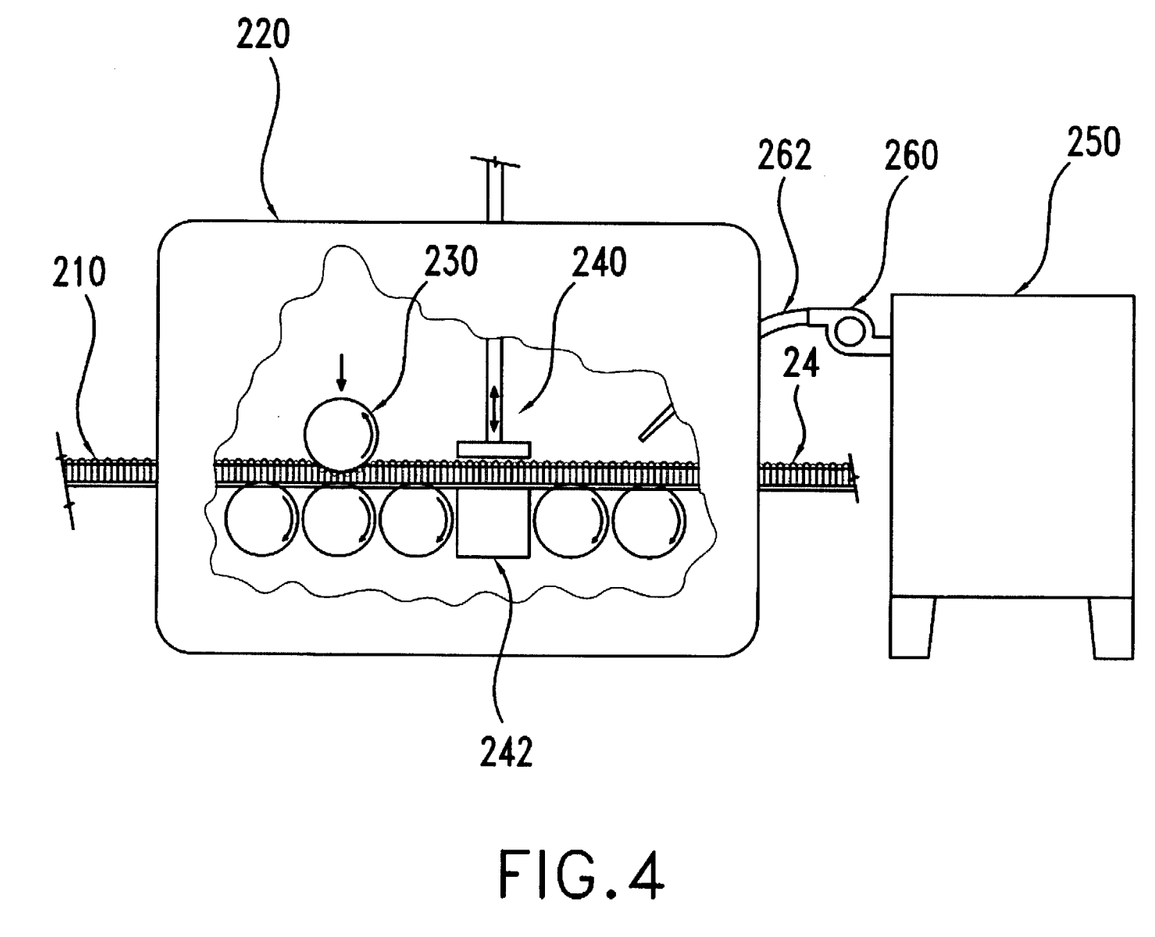
FIG. 4 is a cross-sectional side view showing mechanical rolling and hammering operations to break apart latex binder inside a refrigerated chamber.

FIG. 4 is a side view of a simplified drawing which schematic depicts both rolling and hammering operations as well as the various components of a dry ice blasting system. In this illustration, conveyor 200 carries carpet segment 210 into a refrigerated freezing chamber 220. Inside this chamber, the carpet segment is squeezed hard without being torn by a high-pressure roller 230, and is also pounded by a hammer 240 while sliding across a heavy steel anvil support region 242. FIG. 4 also depicts a supply component 250, which generates dry ice or otherwise supplies cold pellets to a pumping device 260, which pumps the pellets into a suitable insulated hose or other receiving conduit 262, which carries the pellets to one or more nozzles 264 inside the freezing chamber 220.

As an alternate embodiment which uses a somewhat different cold and dry process, a pumping device can be used to blast small frozen pellets made of an abrading compound that is chemically compatible for recycling purposes, into the abrasion zone. The phrase, "a compound that is chemically compatible with carpet pile material for recycling purposes" refers to a compound with the following characteristics: (1) at the temperatures of interest, it can be formed into solid, non-sticky pellets that are suitable for use as abrading agents, and (2) it can be mixed together with the pile material from a carpet, without severely degrading the value of the pile material as a feedstock for recycling purposes.

As one example, nylon pellets can be used as abrading agents for decompiling carpets with nylon piles fibers. A substantial portion of the pellets will usually be recoverable after the carpet decompiling operation, so that they can be reused directly, while any nylon pellets that remain mixed with the separated nylon pile material will not substantially degrade the value of the recovered pile material. If desired, the pellets can even be made of the same type and grade of nylon that is used in the carpet piles. Alternately, if a certain carpet segment has pile fibers made of a different synthetic material, such as polyester, then the abrading pellets can also be made of that same synthetic material.

Since this operation can be carried out nearly identically with the dry ice blasting illustrated by FIGS. 2 and 3, those two figures can be deemed to illustrate this embodiment as well, if pellets 46 and 86 depict nylon or some other plastic or other suitable material rather than dry ice. A system of this nature which uses plastic or other such pellets can be designed so that most of the pellets will fall into a collection device after they impact on the carpet. This will allow the large majority of the plastic or other pellets to be recovered and reused repeatedly, and will eliminate the need for generating and using large quantities of dry ice.

In addition, if desired, a combination or sequence of nylon pellets and dry ice pellets can be used. For example, frozen nylon pellets 46 can be blasted out of nozzle 42 in FIG. 2, to impact and abrade the binder layer 12 which holds secondary backing layer 14. This step will only suffer from very low losses of the nylon pellets, since the vast majority of the pellets will simply bounce off of the surface of the secondary backing layer 14 and fall into a collection basin. Immediately after the secondary backing layer 14 is pulled away, while the primary backing layer remains frozen and brittle, dry ice pellets 86 can be blasted out of nozzle 82 in FIG. 3, to shatter and remove any deeper latex 19 that binds pile fibers 17 to the primary backing layer 18.

If a carpet segment has pile fibers made of wool, then the reference to a "chemically compatible" material will depend on the use that is intended for the recovered wool. For example, if recycled wool recovered from a carpet is going to be stuffed inside some form of enclosure and used for bulk insulation, then suitable pellets can be made of any material that is suitable for inclusion in such insulation, such as a relatively low-density plastic that has low levels of thermal conductivity.

Thus, there has been shown and described a new and useful method for using cold and dry abrasion to remove the latex binder from carpet segments that are being decompiled for recycling purposes. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

We claim:

1. A method of separating carpet pile material from at least one carpet backing layer in a segment of discarded carpet, comprising the following steps:

a. ejecting cold pellets from a nozzle at a speed and in a direction and manner which causes the cold pellets to impact and abrade carpet binding material in the segment of discarded carpet, thereby causing substantial breakage of the carpet binding material and loosening of at least one carpet backing layer from the carpet pile material; and b. removing at least a portion of the carpet binding material from the segment of discarded carpet; and, c. separating at least a portion of the carpet pile material from at least one carpet backing layer.

2. The method of claim 1 wherein the cold pellets comprise pellets made of frozen carbon dioxide.

3. The method of claim 1 wherein the cold pellets comprise pellets made of a compound that is chemically compatible with carpet pile material for recycling purposes.

4. The method of claim 3 wherein nylon pellets are used to abrade a segment of discarded carpet having nylon pile material.

5. The method of claim 3 wherein pellets made of a compound that is suitable for insulation purposes are used to abrade a segment of discarded carpet having wool pile material.

6. The method of claim 1 wherein the separation step comprises removal of a secondary backing layer from the segment of discarded carpet.

7. The method of claim 1 wherein the separation step comprises removal of carpet pile material from a primary backing layer.

8. The method of claim 1 wherein a secondary backing layer removed from the carpet segment in a first separation step, and wherein the carpet pile material is subsequently removed from a primary backing layer in a second separation step.

9. The method of claim 1 wherein the step of ejecting cold pellets from a nozzle is carried out in a chamber that is chilled or refrigerated in a manner that increases brittleness of the carpet binder material.

10. The method of claim 1 wherein the segment of discarded carpet is carried upon a supporting device which is chilled or refrigerated in a manner that increases brittleness of the carpet binder material.

11. A method of breaking apart binder material which secures carpet pile material to a carpet backing layer in a segment of discarded carpet, to facilitate the separation of the carpet pile material from the carpet backing layer so that each component of the segment of discarded carpet can be treated and used appropriately, comprising the steps of:

a. chilling the segment of discarded carpet to a temperature substantially below room temperature at which the binder material becomes substantially brittle;

b. using mechanical force, in a manner that does not require steam or liquid to contact the segment of discarded carpet, to break apart the binder material and degrade at least a substantial portion of the binder material into fragments that can be removed by mechanical means from the segment of discarded carpet, wherein such mechanical treatment does not substantially tear the carpet backing layer but instead leaves the carpet backing layer substantially intact, thereby facilitating subsequent disassembly of the segment of discarded carpet.

12. The method of claim 11 wherein the mechanical force comprises abrasion by pellets ejected from a nozzle, at a suitable speed and pressure.

13. The method of claim 11 wherein the mechanical force is imposed on the carpet by means of at least one pressure-bearing roller device which subjects the segment of discarded carpet to localized pressure sufficient to cause fragmentation of the binder material.

14. The method of claim 11 wherein the mechanical force is generated by means of a hammering device which impacts upon the segment of discarded carpet while the segment of discarded carpet is supported on a non-yielding anvil surface.

15. A machine for separating carpet pile material from at least one carpet backing layer in a segment of discarded carpet, comprising the following components:

a. a carpet conveyor device, designed for conveying segments of discarded carpet through a cold abrasion zone;

b. a supply component designed for supplying cold pellets to a pumping and hose assembly;

c. a pumping assembly coupled to the supply component and to at least one receiving conduit, designed for pumping the cold pellets received from the supply component to a suitable pressure or speed and injecting the cold pellets into the receiving conduit;

d. at least one ejector nozzle coupled to the receiving conduit in a manner that directs cold pellets emerging from the receiving conduit into the cold abrasion zone, in a manner that causes abrasion and breakage of binder material in a segment of discarded carpet being carried by the carpet conveyor device.

16. The machine of claim 15, which also comprises a vacuuming device for removing fragments of broken binder material from the segment of discarded carpet.

17. The machine of claim 15, which also comprises a device for pulling away a secondary backing layer from the segment of discarded carpet after the carpet binder material has been abraded in the cold abrasion zone.

18. The machine of claim 15, which also comprises a device for pulling away carpet pile fibers from a primary backing layer after the carpet binder material has been abraded in the cold abrasion zone.

* * * * *